United States Patent [19]
Friedlander et al.

[11] Patent Number: 5,929,610
[45] Date of Patent: Jul. 27, 1999

[54] METHOD AND APPARATUS FOR SHOOT-THROUGH DETECTION AND ACCOMMODATION IN AN ELECTRIC POWER SYSTEM INCLUDING A SYNCHRONOUS GENERATOR POWER SOURCE

[75] Inventors: Ariel Friedlander, Mequon, Wis.; Bret Dwayne Worden, Union City, Pa.; Myron Lee Smith, Fairview, Pa.; Charles Earl Cooper; Ajith Kuttannair Kumar, both of Erie, Pa.

[73] Assignee: General Electric Company, Erie, Pa.

[21] Appl. No.: 08/796,308

[22] Filed: Feb. 7, 1997

[51] Int. Cl.$^6$ ........................................... H02H 7/06
[52] U.S. Cl. ............................ 322/37; 318/153; 318/154
[58] Field of Search ..................... 361/20, 21; 318/153, 318/154; 322/37

[56] References Cited

U.S. PATENT DOCUMENTS

| | | | |
|---|---|---|---|
| 3,805,144 | 4/1974 | McSparran | 322/25 |
| 5,168,416 | 12/1992 | Bailey et al. | 361/31 |
| 5,245,495 | 9/1993 | Bailey et al. | 361/31 |
| 5,528,445 | 6/1996 | Cooke et al. | 361/20 |
| 5,583,420 | 12/1996 | Rice et al. | 322/25 |

*Primary Examiner*—Nestor Ramirez
*Assistant Examiner*—Peter Medley
*Attorney, Agent, or Firm*—Jill M. Breedlove; Marvin Snyder

[57] ABSTRACT

A shoot-through protection system for an electric power generating system including a synchronous generator, a bridge rectifier coupled to an output of the generator for converting alternating current (AC) from the generator to direct current (DC) at a rectifier output, and at least one inverter coupled to the rectifier output for converting the DC output to a controlled frequency AC output for application to a load. The generator has a separately excited field winding in which the magnitude of field excitation controls the voltage output of the generator. A microprocessor-based controller regulates generator field excitation in a manner to control the DC output of the rectifier. The generator is protected from a shoot-through in the inverter by detecting a sustained voltage drop in the rectifier DC output and reversing generator field excitation in response to such a voltage drop to rapidly drive generator output voltage to substantially zero volts.

10 Claims, 2 Drawing Sheets

5,929,610

METHOD AND APPARATUS FOR SHOOT-THROUGH DETECTION AND ACCOMMODATION IN AN ELECTRIC POWER SYSTEM INCLUDING A SYNCHRONOUS GENERATOR POWER SOURCE

BACKGROUND OF THE INVENTION

This invention relates generally to electrical propulsion systems for traction vehicles (such as diesel-electric locomotives) equipped with either direct current or alternating current traction motors, and it relates more particularly to improved means for protecting such a system from serious damage in the event of an overvoltage reflected onto a field winding of a synchronous generator as a result of a shoot-through condition in a power circuit coupled to an output of the generator.

In a modern diesel-electric locomotive, a thermal prime mover (typically a 16-cylinder turbocharged diesel engine) is used to drive an electrical transmission comprising a synchronous generator that supplies electric current to a plurality of electric traction motors whose rotors are drivingly coupled through speed-reducing gearing to the respective axle-wheel sets of the locomotive. The generator typically comprises a main 3-phase traction alternator, the rotor of which is mechanically coupled to the output shaft of the engine. When excitation current is supplied to field windings on the rotating rotor, alternating voltages are generated in the 3-phase armature windings on the stator of the alternator. These voltages are rectified and applied to the armature and/or field windings of the DC traction motors or inverted to AC and applied to AC traction motors.

In normal motoring operation, the propulsion system of a diesel-electric locomotive is so controlled as to establish a balanced steady-state condition wherein the engine-driven alternator produces, for each discrete position of a throttle handle, a substantially constant, optimum amount of electrical power for the traction motors. In practice, suitable means are provided for overriding normal operation of the propulsion controls and reducing engine load in response to certain abnormal conditions, such as loss of wheel adhesion or a load exceeding the power capability of the engine at whatever engine speed the throttle is commanding. This response, generally referred to as deration, reduces traction power, thereby helping the locomotive recover from such temporary conditions and/or preventing serious damage to the engine.

In addition, the propulsion control system conventionally includes means for limiting or reducing alternator output voltage as necessary to keep the magnitude of this voltage and the magnitude of load current from respectively exceeding predetermined safe maximum levels or limits. Current limit is effective when the locomotive is accelerating from rest. At low locomotive speeds, the traction motor rotors are rotating slowly, so their back EMF is low. A low alternator voltage can still produce rated motor flux and maximum motor current which in turn produces the high tractive effort associated with low speeds. On the other hand, the alternator voltage magnitude must be at a higher level whenever locomotive speed is high. At high speeds the traction motor rotors are rotating rapidly and have a high back EMF, and the alternator voltage must then be high to produce the required flux in the traction motors. The power system for AC motors can exhibit a condition, commonly referred to as "shoot-through", which can have detrimental effects on the synchronous generator or alternator. In a typical AC traction motor system, the power output of the traction alternator is supplied to a rectifier circuit which converts the AC output of the alternator to DC. This DC power is then inverted by a solid state inverter into a frequency controlled AC power for application to the AC motor. The speed of the AC motor is controlled by the frequency of the supplied AC power. The inverter is conventionally arranged to provide 3-phase AC power and includes a plurality of controllable rectifiers such as silicon controlled rectifiers (SCR) or gate turnoff (GTO) thyristors. Each phase has at least two such devices connected in series between the relatively positive and relatively negative DC power buses extending from the rectifier circuit. During motoring operation, one of the devices in a phase is always off while the other device is conducting. If both devices were conducting simultaneously, the devices would form a short circuit across the rectifier output buses. Such a condition is referred to as a shoot-through and can result in very high currents.

Various failures can contribute to a shoot-through condition. For example, one device may simply fail to commutate off before another device begins conducting. More commonly, one device initially fails to a short-circuit condition and the second device in series with it is gated into conduction resulting in a short circuit between the DC power buses. The deration function of the propulsion system cannot respond sufficiently fast to prevent damage to the power system.

U.S. Pat. Nos. 5,168,416 and 5,245,495 describe one form of protection circuit for a DC electric traction motor using a series connected solid state switching device to disconnect the alternator field winding from its power source upon detection of a high current surge. One disadvantage of this system is that the series switching device, e.g., a GTO, must be sized to carry alternator field current during normal system operation. Further, the series device requires forced air cooling to prevent overheating and its stress level is high due to the continuous current it must carry.

As discussed above, the 3-phase synchronous generator in a locomotive propulsion system develops an output voltage which is a function of its rotor shaft RPM and the DC current applied to its field windings. The 3-phase output is converted to DC power by a 3-phase full bridge rectifier connected to the generator armature windings. This rectifier may contain fuses which function as protective devices to protect the alternator from overvoltages caused by failure of a device in or connected to the rectifier. The devices are typically solid-state diodes and fail to a "short-circuit" condition. In an AC motor system, the DC power is applied to an inverter and inverted to a controlled frequency power. Short-circuit protection for the inverters has normally been provided by fuses such as those described above for the rectifier circuit. The fuses are often a maintenance problem, since they last only about four years in the most severe locomotive conditions (e.g., pulling coal up a steep grade, i.e., low speed, maximum power, and at the highest output rectifier currents). When a fuse blows, the locomotive has to operate either at a reduced horsepower or not at all. Accordingly, it is desirable to provide a protection system which does not rely solely on fuses for short-circuit protection and avoids the need for series connected power devices and associated control circuitry.

SUMMARY OF THE INVENTION

A general objective of the present invention is to provide improved protection for a locomotive propulsion system experiencing a short-circuit condition in an output circuit of a power alternator.

A more specific objective of the present invention is to provide shoot-through protection for an alternator or synchronous generator in a locomotive propulsion system against an overvoltage condition caused by reflected AC voltages on the field winding of the generator as a result of a short circuit condition in electronic circuits connected to the armature of the generator.

In one form, shoot-through or short-circuit protection in accordance with the present invention is disclosed in an application for a traction vehicle propulsion system including at least one electric traction motor, a synchronous generator having armature and field windings, a controllable source of excitation current connected to the field windings, and electric power conditioning means interconnecting the armature windings to the traction motor. The power conditioning means include a bridge rectifier circuit converting alternating current from the armature windings to direct current on a DC bus comprising a pair of relatively positive and negative voltage buses. The protection system includes detecting means for producing a fault signal in response to a rapid reduction of voltage on the DC bus in excess of a preselected rate-of-change of voltage. In response to the fault signal, the magnitude of the DC bus voltage drop causing generation of the fault signal is compared to a preselected threshold magnitude and the generator field excitation reduced if the DC bus voltage drop exceeds the threshold magnitude.

Preferably, the protection function is implemented in software programmed into a microprocessor-based control system for the traction vehicle. Accordingly, the present invention eliminates the need for additional power circuits to interrupt generator output power. The system utilizes existing measuring devices in the propulsion system, namely, DC voltage sensors used normally to provide voltage measuring for power regulation. The microprocessor is programmed to compute voltage rate-of-change from consecutive voltage samples in a normal voltage sampling routine. A stored sample is compared to next occurring sampled values to derive the magnitude of voltage change for comparing to the selected threshold value. Thus, the method requires no additional hardware to implement shoot-through protection.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
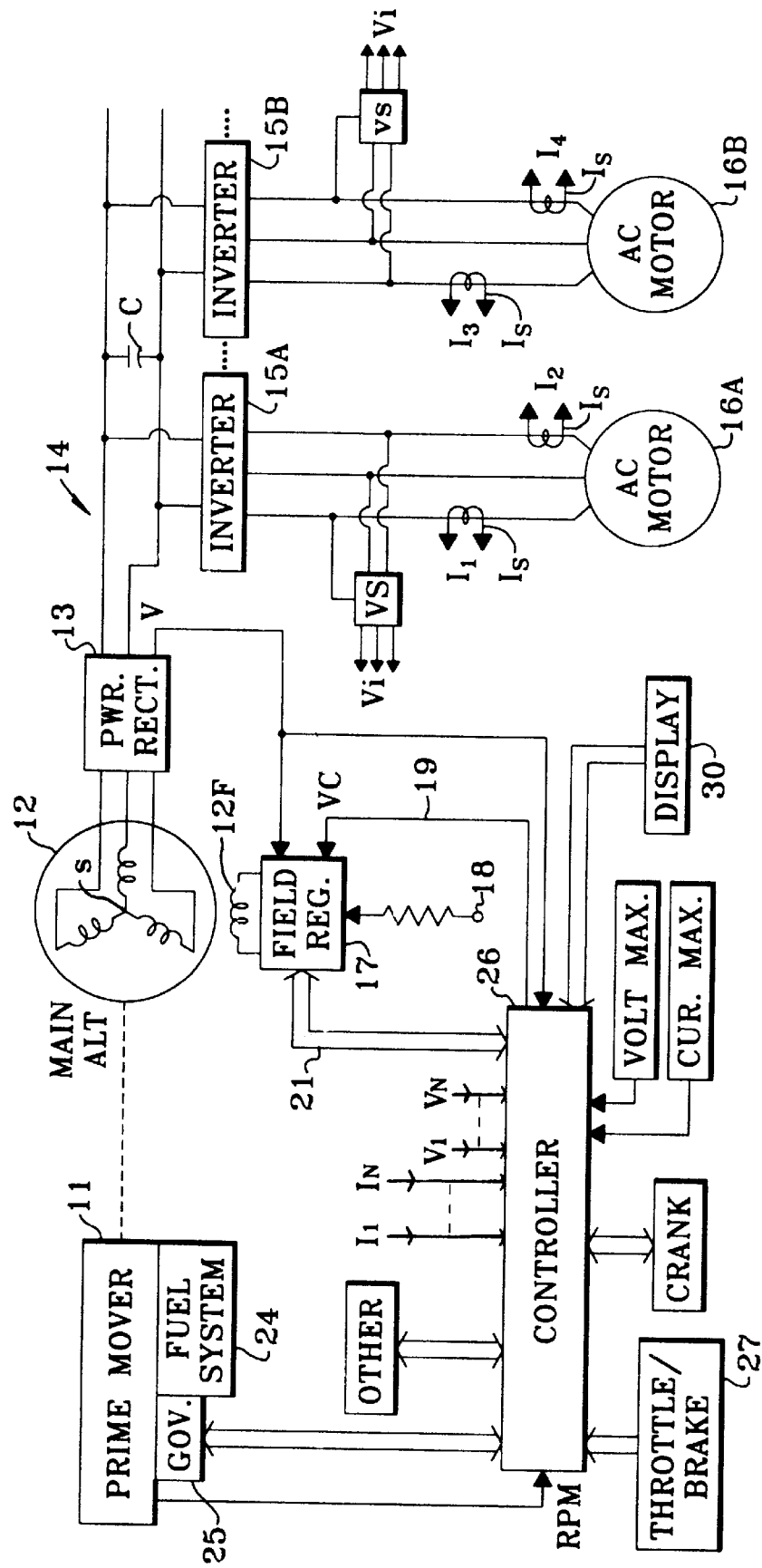
FIG. 1 is a functional block diagram of a synchronous generator propulsion system with which the present invention may be used.

A propulsion system with which the present invention may be used is shown in FIG. 1 and includes a variable-speed prime mover 11 mechanically coupled to the rotor of a dynamoelectric machine 12 comprising a 3-phase alternating current (AC) synchronous generator, also referred to as the main traction alternator. The main alternator 12 has a set of three Y-connected armature windings on its stator. In operation, it generates 3-phase voltages in these windings, which voltages are applied to AC input terminals of at least one 3-phase, full-wave uncontrolled power rectifier bridge 13. In a conventional manner, the bridge 13 is formed by a plurality of pairs of power diodes, two or three such pairs being associated with each of the three different phases of the main alternator 12. The diodes in each pair are serially connected between relatively positive and negative direct current (DC) output terminals of the rectifier bridge, and their junction is connected via a protective fuse (not shown) to the respectively associated AC input terminal of the bridge. The output of the bridge 13 is electrically coupled, via a DC bus 14, in energizing relationship to a plurality of parallel-connected inverters 15, two of which are shown at 15A, 15B coupled to provide AC power to respective adjustable speed AC traction motors 16A, 16B.

A DC link filter capacitor C minimizes transient voltage variations and stabilizes DC voltage on the bus 14. Prime mover 11, alternator 12, and rectifier 13 are suitably mounted on the platform of a self-propelled traction vehicle which typically is a 4-axle or 6-axle diesel-electric locomotive. The locomotive platform is in turn supported on two trucks (not shown), each having two or more axle-wheel sets. A separate traction motor is hung on each axle, and its rotor is mechanically coupled via conventional gearing in driving relationship to the associated axle-wheel set. Suitable current sensing means IS are used to provide a family of current feedback signals I1, I2, $I_N$ that are respectively representative of the magnitudes of the motor currents in at least two phases of each motor, the current in the third phase being the algebraic sum of the currents in the measured phases. In addition, voltage sensors $V_S$ provide signals representative of the phase to negative voltage $V_i$ for each phase of each motor.

The main alternator 12 and the power rectifier 13 serve as a controllable source of electric power for the respective traction motors. The magnitude of output voltage (or current) of this source is determined and varied by the amount of excitation current supplied to field windings 12F on the rotor of the main alternator. These field windings are connected for energization to the output of a suitable source 17 of regulated excitation current IF.

Preferably, the excitation current source 17 comprises a 3-phase controlled rectifier bridge, the input terminals 18 of which receive alternating voltages from a prime mover-driven auxiliary alternator that can actually comprise an auxiliary set of 3-phase armature windings on the same frame as the main alternator 12. The source 17 is labeled "Field Regulator" in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal which during motoring is representative of the average magnitude V of the rectified output voltage of the main alternator 12. The latter voltage magnitude is a known function of the magnitude of excitation current in the field windings 12F and the magnitude of output current in the armature windings of the main alternator, respectively, and it also varies with the speed of the prime mover 11. It is sensed by a conventional voltage sensing module connected across the DC output terminals of the power rectifier.

The prime mover 11 that drives the alternator field 12F is a thermal or internal-combustion engine or equivalent. On a diesel-electric locomotive, the motive power is typically provided by a high-horsepower, turbocharged, 16-cylinder diesel engine. Such an engine has a fuel system 24 that includes a pair of fuel pump racks for controlling how much fuel oil flows into each cylinder each time an associated fuel injector is actuated by a corresponding fuel cam on the engine camshafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called the speed command signal or the speed call signal. An engine speed signal (RPM) indicates the actual rotational speed of the engine crankshaft and hence of the alternator field.

The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N), plus idle and shutdown. N1 corresponds to a minimum desired engine speed and power, while N8 corresponds to maximum speed and full power. With the throttle in its idle position, the controller 26 is operative to impose on the control signal VC a value corresponding to IF=O, and no traction power is produced by the main alternator 12. When dynamic braking of a moving locomotive is desired, the operator moves the throttle handle through its idle position and into an opposite braking position so that the main controller 26 is now supplied with a variable "brake call" signal that will determine the value of the alternator excitation control signal VC.

For each power level of the engine there is a corresponding desired load. The controller 26 is suitably arranged to translate the notch information from the throttle 27 into a reference signal value substantially equal to the value that the voltage feedback signal V will have when the traction power matches the called-for power, and so long as the alternator output voltage and load current are both within predetermined limits, the control signal VC on the input line 19 of the excitation current source 17 is varied as necessary to obtain this desired link voltage. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As is illustrated in FIG. 1, the controller 26 receives the above-mentioned engine speed signal RPM, voltage feedback signal V, and current feedback signals I1, I2, etc. which are representative, respectively, of the magnitudes of current in the individual traction motors, and voltage feedback signals $V_i$ (where I is 1 to N and N is three times the number of motors 16) representative of motor phase voltage. The controller computes power delivered to the motors from measured voltage and current. It also receives a load control signal issued by the governor system 25 if the engine cannot develop the power demanded and still maintain the called-for speed. The load control signal is effective, when issued, to reduce the power reference value in the controller 26 so as to reduce traction motor torques. Additional data supplied to the controller 26 includes: "VOLT MAX" and "CUR MAX" data that establish absolute maximum limits for the alternator output voltage and current, respectively; "CRANK" data indicating whether or not an engine starting (i.e., cranking) routine is being executed; and relevant inputs from other selected sources, as represented by the block labeled "OTHER." The alternator excitation source 17 and the controller communicate with each other via a multi-line serial data link or bus 21.

For the purpose of responding to faults in the propulsion system, the controller 26 is supplied with various feedback signals as described above whose values may vary with the magnitude of the monitored characteristic, e.g., speed, current and voltage. If signals indicate that a characteristic is abnormally high or low, the controller automatically executes certain protective functions and, at the same time, sends appropriate messages or alarm signals to a display module 30 in the cab of the locomotive. For example, the ground fault protective function implemented by the controller 26 is effective to modify the value of the control signal VC on line 19 when ground leakage current is abnormally high so that (1) if the ground current magnitude is in a range between a predetermined deration threshold level and a predetermined maximum permissible limit, the magnitude of alternator field current IF is reduced and consequently the power output of the main alternator 12 is reduced to a fraction of its normally desired amount, which fraction varies inversely with the magnitude of ground current in excess of the deration threshold level, and (2) the power output is restricted to zero for at least a minimum interval of time if the ground current magnitude increases above its maximum limit.

In a preferred embodiment of the prevent invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrically reprogrammable read only memory (EPROM) which also stores tables and data utilized in the program. Contained with the CPU are conventional counters, registers, accumulators, flip-flops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and locomotive speed. In order to implement an electrical braking mode of operation, the controller 26 is programmed to vary the value of the control signal VC as necessary to zero any error between DC link volts and a fixed braking voltage reference.

In accordance with the present invention, the above-described propulsion system includes means for protecting the traction alternator from shoot-through or short circuit conditions in ancillary equipment connected to the rectifier 13, such as, for example, one of the inverters 15. Such a fault is indicated by a rapid and sustained change in the magnitude of the voltage V at the output of rectifier 13.

Figure 2:
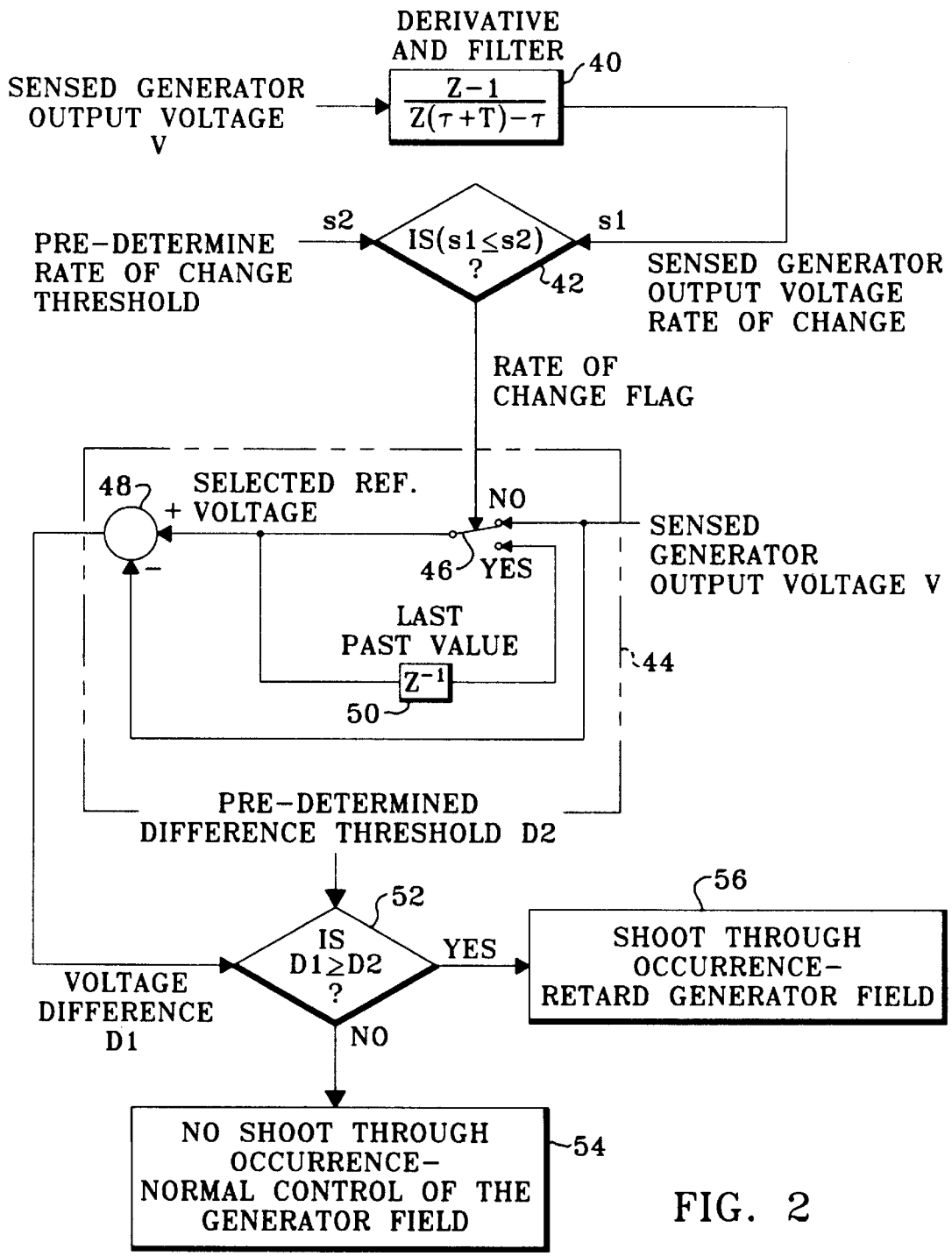
FIG. 2 is a flow chart illustrative of a computer program implementation of the present invention.

Referring now to FIG. 2, there is shown a functional block diagram of a computer program subroutine which implements the shoot-through detection and accommodation function of the present invention. One feature of the present invention is the use of existing field control regulator 17 to remove field excitation and thereby terminate generator power output without additional power interrupting hardware. The subroutine of FIG. 2 is therefore implemented in the controller 26 using existing input signals, such as rectifier output voltage V, to effect a removal and possible reversal of field excitation. The controller 26 can command regulator 17 to reverse field excitation for rapidly driving generator power output to zero.

Block 40 indicates functionally a computation of the rate of change of voltage V based upon a common derivative and filtering algorithm. However, it will be recognized that the controller 26 implements rate of change by comparing two consecutive voltage samples and dividing the difference by the time between samples to obtain the time rate of change of voltage V over short intervals such as several milliseconds depending on the sampling rate. The rate of change of voltage V, functionally indicated as an output S1 of block 40, is compared to a preselected rate-of-change threshold value S2 as indicated by block 42. The value S2 is selected to provide an initial detection of a rapid rate of change of voltage and to eliminate false detections based on changes which may arise from variations in power to the traction motors and switching of the power electronic devices in the inverter circuits 15. However, it will be recognized that rate of change alone is not an accurate detector of shoot-through conditions since a shoot-through is characterized by a rapid and substantial or sustained voltage change such as a change in excess of 100 volts.

If the value S1 is less than the value S2, no action is taken. If value S1 is greater than value S2, block 42 provides a signal, i.e., sets a flag, which causes the controller 26 to compare the present magnitude of voltage V to the magnitude last sampled before the flag was set and compute a difference value as represented by block 44. Functionally, for normal operation with the aforesaid flag not being set, the voltage value V is coupled directly to an inverting input of a summing block 48 and through switch 46 to a second input of block 48 so that the block 48 output is at zero. Each voltage sample V is also coupled to a temporary storage register 50 which stores a single sample value for one sample period, i.e., until replaced by a next occurring sample. If the aforesaid flag is set, switch 46 is set such that the voltage value stored in register 50 is no longer updated and is compared to each of the successively following voltage samples V so long as the flag is set, i.e., so long as the rate of voltage change continues to exceed the threshold value S2. During this time, the output D1 of block 48 represents the difference between the voltage sample stored in register 50 and a present sampled voltage. This comparison of the voltage in register 50 with a present sample allows detection of a sustained or substantial voltage drop. For example, assuming a 10 millisecond sample rate, the voltage drop during one sample interval may not indicate a sustained rate of change. However, the voltage drop over two or more intervals may provide such indication and the present sample may be the sample occurring two or more intervals after the flag is set.

Even though the rate-of-change of rectified generator output voltage V may exceed the threshold value S2, as discussed above, the system should verify the magnitude of the change in voltage so as to eliminate false detections which may be caused by short-term transients. In this regard, the difference value D1 from block 48 is compared to a magnitude threshold value D2 as indicated by comparison block 52. If the value D2 is greater than the value D1, no shoot-through occurrence is deemed to have happened and the system continues with normal voltage regulation control, block 54, as described above. If the value D1 is greater than value D2, shoot-through is presumed and the system initiates a full-voltage reversal in generator field excitation, block 56, using the field regulator 17 to rapidly force the generator output voltage to zero. Note, however, that as long as the rate of change of voltage exceeds the threshold value S2, the system continues to compare the link voltage which existed prior to the rate of change flag being set to each subsequent sample until the rate of change becomes less than the threshold value or a shoot-through condition is detected.

What has been described is a method for recognizing and responding to shoot-through or short-circuit conditions using hardware already existing in a conventional propulsion system control. The method is implemented in a software subroutine operable in the microprocessor-based controller 26. While a specific set of computer instruction code is not disclosed, programmers familiar with microprocessor controls can readily prepare such code without undue experimentation based on the functional block diagram/flow chart of FIG. 2

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method of protecting an electric power generator from a short-circuit condition in an ancillary circuit connected to the generator, wherein the short-circuit condition is characterized by a rapid decrease in generator output voltage, the generator having field windings connected to a source of controllable excitation for controlling generator output voltage, the method comprising the steps of:

monitoring a rate of decrease of generator output voltage;

comparing the monitored rate of decrease of voltage to a selected threshold;

generating a first signal when the monitored rate of decrease of voltage is greater than the threshold;

developing, in response to the first signal, a voltage difference signal representative of the difference in generator output voltage before and after the generation of the first signal;

comparing the voltage difference signal to a voltage set point; and retarding generator field excitation when the difference signal exceeds the set point.

2. The method of claim 1 wherein the step of monitoring generator output voltage includes the step of periodic sampling of generator output voltage and computation of the rate of decrease of voltage between consecutive sampling instances.

3. The method of claim 2 wherein the step of developing includes the step of:

computing the voltage difference between the generator output voltage before the first signal occurred to successive samples occurring after the first signal.

4. The method of claim 3 wherein the ancillary circuit includes a bridge rectifier for converting alternating current at the generator to direct current, and the step of monitoring comprises the step of measuring the magnitude of the direct current voltage at an output of the rectifier.

5. The method of claim 1 wherein the step of retarding includes the step of reversing field excitation.

6. A rectifier shoot-through protection system for an electric traction motor propelled vehicle including at least one electric traction motor, a synchronous generator having armature and field windings, a controllable source of excitation current connected to the field windings, electric power conditioning means interconnecting the armature windings to the traction motor, the power conditioning means including a bridge rectifier circuit for converting alternating current from the armature windings to direct current on a pair of relatively positive and negative voltage buses, the system including:

first means for sensing a rate of decrease of voltage on the voltage buses in excess of a preselected threshold value and for providing a first signal indicative thereof;

second means responsive to said first signal for generating a second signal representative of the magnitude of decrease in the voltage; and third means for comparing said second signal to a selected voltage difference threshold voltage and for generating a fault signal when said second signal magnitude exceeds said threshold voltage.

7. The protection system of claim 6 and including means responsive to said fault signal for retarding field excitation at the generator to reduce generator output voltage.

8. In an electric power generating system including a synchronous generator, a bridge rectifier coupled to an output of the generator for converting alternating current (AC) from the generator to direct current (DC) at a rectifier output, and at least one inverter coupled to the rectifier output for converting the DC output to a controlled frequency AC output for application to a load, the generator having a separately excited field winding in which the magnitude of field excitation controls the voltage output of the generator, the system further including a microprocessor-based controller for regulating generator field excitation in a manner to control the DC output of the rectifier, a method for protecting the generator from a shoot-through in the inverter comprising the steps of:

detecting a sustained voltage drop in the rectifier DC output; and reversing generator field excitation in response to the step of detecting to rapidly drive generator output voltage to substantially zero volts.

9. The method of claim 8 wherein the step of detecting includes the steps of:

sensing a rate-of-decrease of rectifier DC output in excess of a selected threshold rate; and measuring the magnitude of the voltage decrease to identify a sustained change characteristic of a shoot-through.

10. The method of claim 9 wherein the step of measuring includes the steps of:

sampling the magnitude of the rectifier DC output at each of a plurality of consecutive time intervals;

storing a last sampled magnitude sampled immediately prior to the step of sensing;

comparing the stored sampled magnitude to each successive sampled magnitude so long as the sensed rate-of-decrease exceeds the threshold rate; and identifying a sustained voltage drop when the difference between the stored sampled magnitude and one of the successive sampled magnitudes exceeds a selected threshold value.

* * * * *